Dec. 8, 1953     W. R. PETERSEN     2,661,970
PIVOT PIN OR BOLT
Filed March 26, 1949
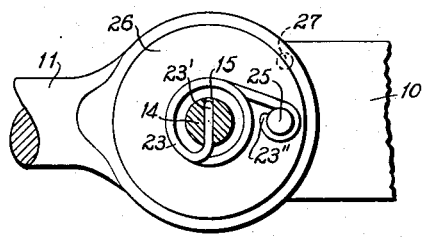
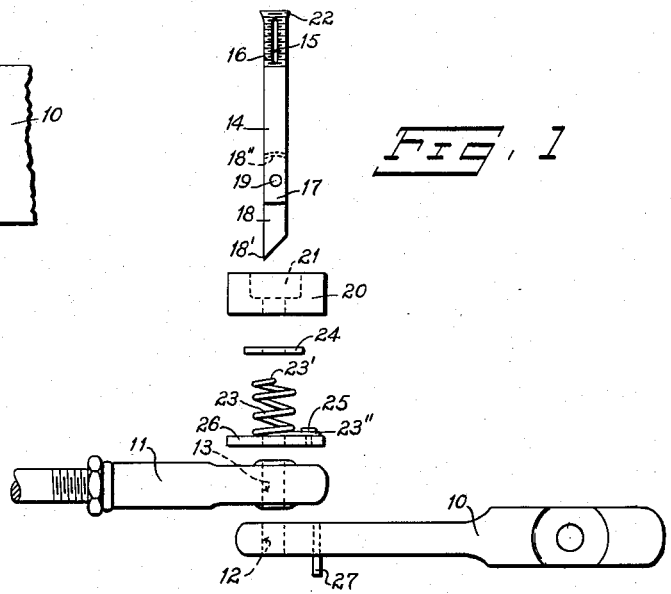
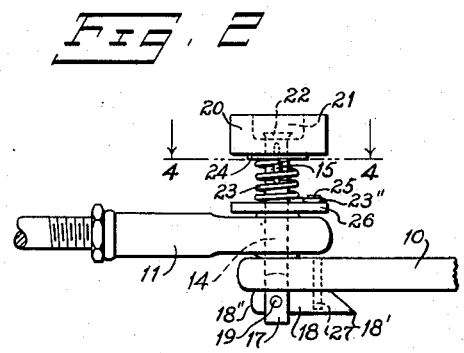
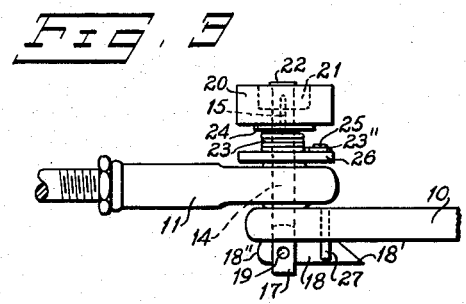
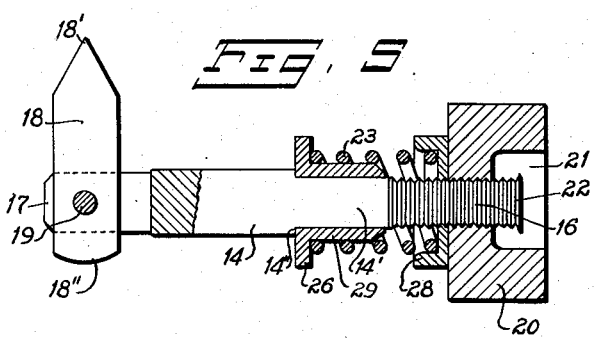
INVENTOR.
Warren R. Petersen
BY Charles S. Wilson
ATTORNEY.

UNITED STATES PATENT OFFICE

2,661,970
PIVOT PIN OR BOLT

Warren R. Petersen, Baldwin, N. Y., assignor to Republic Aviation Corporation, near Farmingdale, N. Y., a corporation of Delaware Application March 26, 1949, Serial No. 83,670

1 Claim. (Cl. 287—101)

This invention relates to bolts or pivot pins and contemplates a unit that has all of the strength and durability of the conventional bolts or devices heretofore used in the connection of structural elements or the components of linkage systems and elsewhere but is distinguished in that it may be quickly and easily inserted or placed in its operative position and be as quickly removed.

The present pin or bolt is especially useful in the connection of parts or structural components in locations where the space surrounding the components or parts is restricted or limited, since this device requires no tools for its connection or disconnection and may, if necessary, be positioned for attachment or removed from attachment by and with one hand only. Incidental to the attachment or removal of the instant bolt or pin it may be tightened or loosened, as desired, with respect to the parts or components which it connects or secures without requiring the use of more than one hand for either adjustment or the employment of tools.

Moreover, regardless of whether the pin or bolt is tightened or is loose in its operative position, its accidental displacement is virtually impossible and it can be and is maintained in its operative position by the inherent features and characteristics of the bolt or pin without the use of lock nuts, washers, safety wire, and the like.

With the above and other objects in view as will be apparent, this invention consists of the construction, combination and arrangement of parts all as hereinafter more fully described, claimed and illustrated in the accompanying drawings wherein:

Fig. 1 is an exploded view of a bolt or pivot pin constructed in accordance with the present invention illustrating it in conjunction with two links or levers that are to be connected thereby at their overlapping, adjoining ends;

Fig. 2 is a side elevation of the present bolt or pivot pin in association with a pair of links or levers showing the relative positions of the components of the bolt or pin assembly after its insertion through the overlapping ends of the connected links or levers and before the tightening thereof;

Fig. 3 is a view like Fig. 2 illustrating the relative positions of the components of the bolt or pin assembly after the tightening thereof;

Fig. 4 is a transverse section taken along line 4—4 of Fig. 2 to show the spring in conjunction with the shank and the means by which its ends are anchored or secured; and Fig. 5 is a fragmentary longitudinal section through a somewhat modified form of the present invention.

The instant pivot pin or bolt is of general adaptation and use in the connection or association of coacting elements of operating or control systems or in the connection or attachment of structural components. However, it is particularly useful in the pivotal connection of the coacting elements of the control systems of airplanes, and also can be employed in the attachment of structural components of aircraft, especially where the space available for the attachment, adjustment and removal of devices of this character is restricted or limited.

Prior to the present invention it has been customary to pivotally connect the links, levers or other components of aircraft control systems, such as the links or levers of a system for the adjustment of movable control surfaces, by bolts or equivalent devices. Where bolts have been used for this purpose it necessarily follows that the bolt must be held stationary while a nut is threaded home thereon. This obviously requires the use of both hands of the mechanic and frequently insufficient space is available at and near the point of connection for these two operations. Furthermore, safety requires that, once the nut is fully adjusted on the bolt, it be locked in its operative position against retrograde movement due to vibration and other causes. Therefore, lock nuts, lock washers and similar devices have been used with not too satisfactory results. Since these locking devices have not always been entirely successful in overcoming any retrograde movement of the unit, safety wire has been commonly used in aircraft construction. This requires the creation of an aperture or apertures in the nut normal to the axis of the bolt through which safety wire may be threaded with its ends attached to some fixed or stationary part of the airplane. Another expedient frequently resorted to is to lock the nut against displacement or movement on the bolt, with a cotter pin. Regardless of the means heretofore employed to lock a standard bolt and unit against displacement, tools have been mandatory and the attachment and removal thereof has almost always required the use of both hands of the mechanic.

All of the safety devices and expedients heretofore used have been open to many objections; among which are first, the difficulty of placing them in their operative position particularly under conditions where space is limited; second, the necessity of using standard or special tools; third, the required use of both hands by the mechanic in placing them in, or removing them from, their operative position; and fourth, the expense entailed both in the initial cost of conventional safety locks and devices and in the replacement thereof after removal. In the latter instance it is frequently necessary, once a pivot bolt or pin of the character heretofore common, has been removed, to replace it with an entirely new bolt and associated parts.

The present invention overcomes most, if not all, of the objectionable characteristics of these prior devices by providing a unitary assembly which may be placed in or removed from its operative position by one hand of the mechanic and without the use of tools. It is also possible, with the instant invention, to provide a pivot pin or bolt that, once having been placed in its operative position, will remain in position, regardless of conditions and of whether it is loose or tight, until it is intentionally removed. Moreover, the present bolt or pivot pin may be rapidly removed and reinserted in its operative position without the destruction or replacement of any of its parts.

In short the present invention provides a pivot pin or bolt which cannot be displaced or loosened by vibration, may be inserted and removed repeatedly without damage and by only one hand of the mechanic and finally, if by chance, it becomes loose, or is by mistake left untightened, in its operative position, will remain in place performing all of its functions until intentionally removed.

In the drawing, which illustrates only one of the many uses of the present device, 10 designates a link or lever comprising one element of an airplane control system. Complemental to and to cooperate with the link or lever 10 is a second link or lever 11. The adjoining terminals of the levers 10 and 11 are to overlap and are respectively provided with the transverse apertures 12 and 13 which, when in registration, may receive a pivot pin or bolt like those heretofore used or one made in accordance with the present invention. The nature and construction of the levers or links 10 and 11 and the arrangement of the apertures 12 and 13 piercing the extremities thereof can be accepted as conventional and per se form no part of the present invention.

The shank 14 of the instant bolt or pin has a threaded end portion 16 and preferably has an elongated slot 15 piercing that threaded end portion. This slot 15 may, in the alternative, comprise a bifurcation extending through the extremity of the shank 14, though it has been found to be better practice to have the slot closed at its outer end as illustrated. The threads of the end portion 16 of the shank 14, slotted as aforesaid, extend inwardly of the shank somewhat beyond the inner end of the slot 15.

At its opposite end the shank 14 is bifurcated to create a pair of spaced, parallel arms 17 between which a latch 18 is pivoted medially of its length, as at 19. This latch 18 is pointed as at 18′ at its outer extremity to facilitate its insertion in the registered openings 12 and 13 in links 10 and 11 and is slightly curved at its inner extremity 18″ so that it may swing freely between the arms. When the latch 18 is aligned with the shank 14, as shown in Fig. 1, it constitutes an extension thereof. In other words the latch 18 has a maximum width substantially equal to the diameter of the shank 14 and has a length which exceeds the respective diameters of the apertures 12 and 13, for the purpose to be hereinafter more fully described.

A nut 20 is threaded on the extremity 16 of the shank 14 and its outer edge surface may be knurled to facilitate the rotation thereof on the shank 14. The outer face of the unit 20 is provided with a cavity or cup 21 and as will be seen from Figs. 2 and 3 the threaded end portion 16 of the shank 14 may project into and on occasion traverse this cup or cavity. Prior to tightening of the assembly in its operative position (Fig. 2) the threaded extremity of the shank terminates approximately at the bottom of the cavity 21 and after the assembly is tightened in its operative position (Fig. 3), the outer extremity of the threaded portion 16 of the shank 14 is substantially in the plane of the outer face of the nut 20. To prevent the nut 20 from ever becoming separated from the threaded extremity 16 of the shank 14, the outer extremity of the shank is enlarged or upset, as at 22, to create a head which will arrest the movement of the nut 20 outwardly on the threaded extremity 16 of the shank 14 prior to disengagement of the shank 14 thereby.

A helical spring 23 encircles the shank 14 between the latch 18 and the threaded extremity 16 thereof. One end 23′ of this spring is bent laterally to be inserted in and permanently engaged by the slot 15 of the shank 14. Thus the spring for all practical purposes becomes one with the shank 14 by having one of its ends 23′ engaged by one end of the shank. A washer 24 is loosely positioned on the shank 14 between the end 23′ of the spring 23 and the inner face of the nut 20 to act merely as an abutment for that end of the spring. It is manifest that not only is one end 23′ of the spring attached to the shank, but that the bodily movement of the spring 23 relative to the shank 14 is limited by the length of the slot 15. The opposite end 23″ of the spring is riveted or otherwise attached, as at 25, to a somewhat larger washer 26 loosely mounted upon the shank 14.

With the washers 24 and 26 mounted on the shank 14 and the spring 23 interposed between them, with one end 23′ seated in the slot 15 and the other end 23″ fixedly secured to the washer 26, the entire assembly is a unit wherein the several components are, for all practical purposes, inseparable. By this means the present invention does away with any gathering and assembling of components of a connector just prior to or concurrently with use.

With the device assembled as aforesaid and with the nut 20 at the outer limit of its path of movement on the threaded end portion 16 of the shank 14, i. e., with head 22 abutting the bottom of the cavity or cup 21, the thumb of one hand may be placed on the outer surface of the nut and the washer 26 may be engaged by the first or second fingers or both of the same hand, whereupon the spring 23 may be compressed between the nut 20 and the washer 26. The pointed end 18′ of the latch 18 is then inserted in the registered openings 12 and 13 of the links or levers 10 and 11 until the inner end 18″ of the latch 18 is free of these openings, after which the latch is moved on its pivot 19 to rest at right angles to the axis of the shank 14 and to project upon both sides thereof as shown in Figs. 2, 3, and 5. Thereupon the release of the pressure on the nut 20 and washer 26 permits the spring 23 to expand and draw the angularly disposed latch 18 into contact with the outer surface of the adjacent lever or link. At this time the overlapping ends of the links or levers 10 and 11 are pivotally secured together and the shank 14 cannot, either unintentionally or accidentally, be removed from the openings or apertures 12 and 13 because the action of the spring 23 and the pressure developed thereby upon the links between the latch 18 on one side and the washer 26 on the other side of the connection prevents any displacement of said latch, from its operative position. This condition of the assembly prior to tightening is disclosed in Fig. 2, and it may be said that the connection thus established between the levers 10 and 11, while substantial and secure, is loose or somewhat "sloppy."

With the device as shown in Fig. 2, the nut 20 may be threaded downwardly on the shank 14 until the spring 23 is substantially fully compressed and the coils thereof rest approximately one upon the other (see Fig. 3). This tightens the entire joint and eliminates any play therein and securely locates and locks the pin or bolt in its operative position.

No provision is made to counteract any retrograde movement of the nut 20 since if the nut 20 threads outwardly on the shank 14, for any reason, this outward movement is arrested if and when the head or upset terminal extremity 22 of the shank 14 contacts or engages the bottom of the cup or cavity 21 in the nut. The only way in which the device can be removed from the apertures 12 and 13 to sever the connection between the links 10 and 12 is to first thread the nut 20 outwardly on the shank 14 until its elements assume the position shown in Fig. 2, whereupon the spring 23 may be compressed between the nut 20 and the washer 26 to permit reciprocation of the shank in said openings and thereby move the latch 18 away from the surface of the adjacent lever or link. The continuation of this movement frees the latch 18 for pivotal movement between the arms 17 so that it may assume a position in alignment with or coextensive of the shank 14, as shown in Fig. 1. The entire device or assembly then may be removed from cooperation with the links or levers by withdrawing the shank 14 from the openings 12 and 13. The insertion and removal of the subject device obviously can be repeated endlessly without damage to the assembly or the separation and loss of any of its elements.

When the components of the pivot pin or nut assembly are positioned as shown in Fig. 2 the nut 20, as above pointed out, is to be threaded inwardly on the shank 14 to tighten the joint or reversely, when they are positioned as shown in Fig. 3, the nut 20 is to be threaded outwardly on the shank 14 to loosen or free the joint. To facilitate either of these threading operations by preventing rotary movement of the shank 14 within the openings 12 and 13, a peg or other suitable projection or stop 27 is fixed to and projects from the lever or link coacting with the latch 18 and is so positioned that it will contact or abut the latch as and if it rotates in either direction. Hence, regardless of the direction of rotation of the nut 20 and the similar rotation of the shank 14, the maximum rotation permitted is approximately 360° when contact is established by the latch with the peg or stop 27. Once this contact is established the rotation of the shank and latch is arrested, and the nut 20 may continue rotating in the same direction without imparting any further rotary movement to the shank 14 and latch 18. In this manner the shank is held fixed against rotary movement whether the joint or connection is being tightened or loosened and without the use of any tool or tools for that purpose.

In Fig. 5 is shown a modification of the bolt or pivot pin assembly illustrated in Figs. 1–4 inclusive. In this form of the invention a portion of the length of the shank 14 is reduced in diameter, as at 14', to create a circumferential shoulder 14'' on the shank medially of its ends. The outer extremity 16 of the reduced portion 14' of the shank is threaded and is provided with the head or upset 22 at its outer extremity in the same manner and for the same purpose as in Figs. 1 to 4, so that the nut 20 is, for all practical purposes, permanently secured to the reduced portion 14' of the shank. In this embodiment of the invention a cup washer 28 is disposed adjacent the inner surface of the nut 20. The cavity of this cup washer 28 faces away from the nut 20 so that its bottom rests flush against the inner face of the nut 20; its cavity or cup may receive and house one end of the spring 23. In opposition to the cup washer 28 with respect to the spring 23 is the washer 26 which encircles the reduced portion 14' of the shank 14 and normally bears against the shoulder 14'' of the shank. A concentric spacer 29 is provided for cooperation with the washer 26 and may be formed integrally on the face thereof opposed to the shoulder 14'' to closely encircle and reciprocate on the reduced portion 14' of the shank. The coil spring 23 encircles the reduced portion 14' of the shank as well as the spacer 29 and at one end thereof is seated in the cavity of the cup washer 28 and at its opposite end is in abutting contact with the face of the washer 26. This spring maintains the normal contact between the washer 26 and the shoulder 14'' of the shank 14.

The operation of the modified device shown in Fig. 5 is identical with the operation of the form illustrated in Figs. 1 to 4 inclusive. The nut 20 is threaded outwardly on the reduced portion 14' of the shank whereupon the compression of the spring 23 is relaxed to be again compressed by pressure exerted between the nut 20 and the washer 26 to the end that the latch 18 may be aligned with the shank 14 and the assembly unit may be inserted in or removed from the registered openings 12 and 13. By threading the nut 20 inwardly of the reduced portion 14' of the shank 14 after the insertion of the latter in the openings 12 and 13 the spring 23 is compressed between the washer 26 and the nut 20 to tighten the joint or connection established by the unit or assembly. Regardless of whether the nut 20 is threaded inwardly or outwardly of the reduced portion 14' of the shank 14 the spacer 29 associated with the washer 26 can, even if stationary on the shank, have telescopic cooperation with the spring 23. When the spring 23 is as fully compressed as desired between the nut 20 and associated cup washer 28 and the washer 26, the spacer 29 telescopes with the cavity of the washer 28 and by its contact with the bottom of the washer arrests any further compression of the spring 23 so that this spring can never be said to be over-compressed.

From the foregoing it is manifest that the present unitary bolt or pivot pin, in Figs. 1 to 4 inclusive, consisting of the shank 14, the latch 18, nut 20, washers 24 and 26 and the spring 23 interposed between them and permanently secured at its ends respectively to the shank 14 and washer 26, and in Fig. 5 of the shank 14 having one end portion 14' reduced and threaded, the latch 18, nut 20, washers 26 and 28, spacer 29 either integral with or merely abutting the washer 26, and the spring 23 disposed between the washers 26 and 28, comprises one assembly wherein the enumerated components or elements are, in effect, permanently associated one with the other and cannot under normal conditions, become separated. Moreover, the spring 23 of the unit may always be compressed and the outward movement of the nut 20 arrested with one hand only, and at the same time and with the same hand the latch 18 may be either aligned with the shank 14 or be placed at right angles thereto by one finger of the same hand.

Furthermore, it is evident that if the joint is relatively loose as disclosed in Fig. 2, the pin or bolt assembly cannot be dislodged or removed from the openings 12 and 13 without first compressing the spring 23 and positioning the latch 18 in alignment with and coextensive of the shank 14 as it is illustrated in Fig. 1.

What is claimed is:

A pivot pin or bolt comprising a shank for insertion in registered openings in a pair of members to be joined thereby, said shank having one end portion thereof reduced to establish a shoulder between said reduced end portion and the remainder of said shank, threads on said reduced portion extending inwardly from the extremity thereof, a nut coacting with said threads, means at the extremity of said reduced portion to prevent the removal of said nut, first and second washers loosely mounted on said reduced portion, said first washer adapted to normally rest against said shoulder and said second washer against the inner face of said nut, a spacer loosely mounted on said reduced portion between said first and second washers, a spring encircling said reduced portion between said first and second washers, a latch pivoted to the end of said shank opposed to said reduced portion to rest either in an inoperative position coextensive with said shank or in an operative position at right angles thereto to bear against the adjacent surface of one of the members, and a projection secured to and projecting outwardly from the surface of the member coacting with said latch to project into the path of rotary movement thereof when in its operative position to arrest such rotary movement, said nut effective upon rotation in one direction on said reduced portion to move said second washer toward said first washer to compress said spring therebetween, said spacer effective upon such rotation to permit the full compression of said spring and to prevent the over compression thereof, and the distance between said latch and shoulder of said shank being less than the combined thicknesses of the members.

WARREN R. PETERSEN.

References Cited in the file of this patent

UNITED STATES PATENTS

| Number | Name | Date |
|---|---|---|
| 161,752 | Carleton | Apr. 6, 1875 |
| 450,127 | Wrigley | Apr. 7, 1891 |
| 743,211 | Alexander | Nov. 3, 1903 |
| 1,540,735 | Kroff | June 2, 1925 |
| 2,318,548 | Whitehead et al. | May 4, 1943 |
| 2,398,644 | Johnson | Apr. 16, 1946 |

FOREIGN PATENTS

| Number | Country | Date |
|---|---|---|
| 452,358 | Great Britain | Aug. 20, 1936 |